United States Patent Office 3,579,531
Patented May 18, 1971

---

3,579,531
PROCESS FOR PREPARING 1-PHENYL-
1,2,3-TRIAZOLES
Peter Scheiner, Princeton, N.J., assignor to
Mobil Oil Corporation
No Drawing. Filed Feb. 28, 1968, Ser. No. 708,753
Int. Cl. C07d 55/02
U.S. Cl. 260—308                                     6 Claims

ABSTRACT OF THE DISCLOSURE

Phenyl triazole and various substituted phenyl triazoles are prepared by reacting substituted phenyl azides or phenyl azide with a vinyl ester of a lower alkanoic acid preferably vinyl acetate, at reflux temperature and at atmospheric pressure. 1-phenyl-1,2,3-triazole and substituted derivatives thereof are stabilizers for polyolefins. The 1-halophenyl-1,2,3-triazoles are effective fungicides and miticides.

BACKGROUND OF THE INVENTION

Field of the invention

This invention is directed to substituted phenyl triazoles. It is more particularly concerned with a method for preparing 1-phenyl-1,2,3-triazoles and a novel class of phenyl-1,2,3-triazoles that are fungicides and miticides.

Description of the prior art

It has been proposed to prepare triazoles by several methods. Thus, 1-phenyl-1,2,3-triazole has been produced by reacting phenyl azide with acetylene. It will be recognized, however, that actylene is very difficult to handle and requires special techniques and special equipment, including presure equipment. When phenyl azide has been reacted with vinyl compounds, such as acrylonitrile, the vinyl portion enters into the formation of a triazole ring, but the rest of the vinyl compound remains, undesirably, attached thereto.

SUMMARY OF THE INVENTION

It has now been found that triazoles can be prepared by reacting a phenyl azide with a vinyl compound without retaining the rest of the compound as a ring substituent. It has, also, been discovered that certain novel phenyl triazole derivatives are effective fungicides and miticides.

Accordingly, this invention provides a method for preparing phenyl triazoles that comprises reacting a phenyl azide having the formula:

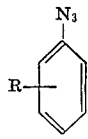

wherein R is selected from the group consisting of hydrogen, halogen, nitro, lower ($C_1$–$C_4$) alkyl lower ($C_1$–$C_4$) alkoxy, hydroxy, and aryl with a vinyl or substituted vinyl ester of a lower ($C_1$–$C_4$) alkanoic acid, using an excess of said vinyl ester as solvent, under reflux conditions, and at atmospheric pressure.

This invention also provides novel 1-phenyl triazoles having the formula:

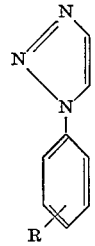

wherein R is halogen and their use as fungicides and miticides.

One of the reactants in the process of this invention is phenyl azide or a derivative of phenyl azide as aforedefined. The phenyl azides can be prepared from aniline or the corresponding substituted aniline by reacting with nitrous acid and $NaN_3$, using the method described in Org. Syn., 31, 14 (1951). Non-limiting examples of the phenyl azide reactant are phenyl azide; p-bromophenyl azide; p-chlorophenyl azide; o-bromophenyl azide; p-iodophenyl azide; p-nitrophenyl azide; O-methylphenyl azide; m-methylphenyl azide; p-ethylphenyl azide; p-t-butylphenyl azide; m-methoxyphenyl azide; p-propoxyphenyl azide; p-hydroxyphenyl azide; m-hydroxyphenyl azide; and p-phenyl phenyl azide.

The other reactant in the process of this invention is a vinyl or substituted vinyl ester of a lower ($C_1$–$C_4$) alkanoic acid, possessing at least one hydrogen at the position one carbon removed from the ester group on the double bond. These esters and their preparation are well known in the art. The vinyl ester reactants include vinyl formate, vinyl acetate, vinyl propionate, vinyl butyrate and vinyl isobutyrate. Vinyl acetate is the one most readily available and is preferred.

The vinyl ester acts both as a reactant and as the solvent in the method of this invention. The stoichiometric amount for the reaction is one mole per mole of the phenyl azide reactant. Accordingly a molar excess of vinyl ester will be used, suitably between about 3 moles and about 30 moles of vinyl ester per mole of the phenyl azide reactant.

The reaction between the vinyl ester and the phenyl azide reactant is suitably carried out at reflux temperatures, generally between about 50° C. and about 150° C. The time of reaction will be between about one hour and about 60 hours. The by-product in the formation of the 1-phenyl-1,2,3-triazole product is a lower alkanoic acid derived from the vinyl ester reactant used; in the case of the preferred vinyl acetate, acetic acid.

At the end of the reaction period, the excess vinyl ester is removed by distillation under reduced pressure to obtain crude, crystalline 1-phenyl-1,2,3-triazole product which will contain most of the lower alkanoic acid by-product. Pure product, separated from acid, is readily obtained by recrystallization from a solvent in which the alkanoic acid is infinitely soluble, such as methanol, ethanol, or diethyl ether.

EXAMPLE 1 p-Bromophenyl azide (4.0 g.) was dissolved in 25 ml. of vinyl acetate and the solution was refluxed at atmospheric pressure for 40 hours. Excess vinyl acetate was evaporated under reduced pressure to give the crude, crystalline product. This material was recrystallized from methanol to give pure 1-p-bromophenyl-1,2,3-triazole, M.P. 147°. The infrared and nuclear magnetic resonance spectra confirmed the assigned structure.

*Analysis.*—Calcd. for $C_8H_6N_3Br$ (percent): C, 42.88; H, 2.70; N, 18.75. Found (percent): C, 43.01; H, 2.82; N, 18.9.

EXAMPLES 2 AND 3

Using the procedure described in Example 1, 1-p-chlorophenyl - 1,2,3-triazole and 1-p-nitrophenyl - 1,2,3-triazole were prepared by reacting excess vinyl acetate with respectively p-chlorophenyl azide and p-nitrophenyl azide.

Leaf rust test( systemic test)

Six (6) Seneca Wheat Seeds are planted in each 2" diameter clay pot containing pure sand. The pots are placed in the greenhouse to germinate and grow until they are 3" in height (4–7 days depending on temperature of the greenhouse).

When plants are ready the following procedure is followed: Weigh out 12.5 mg. of the candidate compound on the analytical balance. Add four drops of Tween 20 over the compound, stir, and add 10 ml. of acetone. Take 1 ml. of the above and add 20 ml. of water giving a 10 p.p.m. solution based on the weight of the soil to be drenched. Pour 15 ml. of formulation on each of two 6" pots.

Plants are inoculated 48 hours after treatment by wetting the foliage late in the afternoon and dusting the foliage with Wheat Leaf Rust Spores (*Puccinia rubiovera tritici*). Plants are placed immediately in the humidity (dew) chamber and held overnight. Plants are removed at 10:00 a.m. the following morning and placed in the greenhouse.

Method of recording results

Disease severity is determined 10 days after returning the plants to the greenhouse and rated visually according to the percent of disease reduction.

EXAMPLE 4

1-p-bromophenyl-1,2,3-triazole was tested for systemic fungicidal activity in the Leaf Rust Test. It effected 70 percent disease reduction.

Two-spotted spider mite—*Tetranychus telarius linnaeus*

Mite cultures are maintained in the greenhouse and reared on Henderson bush lima beans. Screened cages are used to help confine and keep the mites from spreading to other portions of the greenhouse and to prevent predators and parasites from infesting the mite colonies. The greenhouse is kept at 75° F. Test bean plants are inoculated 24 hours prior to the need by placing mite-infested trifoliolate leaflets, ventral side up, on the primary leaves.

Infested trifoliolate bean leaves are selected that have as many as 20 adult mites per leaf. Leaves with mites attached are momentarily dipped into a 500 p.p.m. suspension of the candidate compound and then placed (petiole only) in a 4-ounce bottle of water for observation. Counts are made after 72 hours to determine the percent kill.

EXAMPLE 5

1-p-bromophenyl-1,2,3-triazole and 1-p-chlorophenyl-1,2,3-triazole were each tested for effectiveness as a caricides against the Two-Spotted Spider Mite. Each effected 70 percent kill at 500 p.p.m.

Although the present invention has been described with preferred embodiments, it is to be understood that modifications and variations may be resorted to, without departing from the spirit and scope of this invention, as those skilled in the art will readily understand.

What is claimed is:

1. A method for preparing phenyl triazoles that comprises reacting a phenyl azide having the formula:

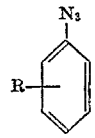

wherein R is selected from the group consisting of hydrogen, halogen, nitro, lower ($C_1$–$C_4$) alkyl, lower ($C_1$–$C_4$) alkoxy, hydroxy and phenyl with a vinyl ester of a lower ($C_1$–$C_4$) alkanoic acid, using an excess of said vinyl ester as solvent, under reflux conditions, and at atmospheric pressure.

2. The method defined in claim 1, wherein said vinyl ester is vinyl acetate.
3. The method defined in claim 2, wherein R is halogen.
4. The method defined in claim 2, wherein R is chloro.
5. The method defined in claim 2, wherein R is bromo.
6. The method defined in claim 2, wherein R is nitro.

References Cited

Benson et al.: Chemical Reviews, vol. 46, pp. 9–10 (1950).

ALTON D. ROLLINS, Primary Examiner

U.S. Cl. X.R.

260—349; 424—269